United States Patent
Sugiura et al.

(10) Patent No.: US 7,693,007 B2
(45) Date of Patent: Apr. 6, 2010

(54) ULTRASONIC SENSOR WITH SEPARATE SENDING DEVICE AND RECEIVING DEVICE

(75) Inventors: Makiko Sugiura, Hekinan (JP); Yasuyuki Okuda, Aichi-gun (JP); Takahiko Yoshida, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/216,730

(22) Filed: Jul. 10, 2008

(65) Prior Publication Data
US 2009/0028002 A1   Jan. 29, 2009

(30) Foreign Application Priority Data
Jul. 25, 2007   (JP)   ............... 2007-193225

(51) Int. Cl.
*G01S 15/93* (2006.01)
(52) U.S. Cl. .......................................... 367/99
(58) Field of Classification Search ................ 367/99, 367/104, 151, 152; 310/328
See application file for complete search history.

(56) References Cited

U.S. PATENT DOCUMENTS

| | | | | | |
|---|---|---|---|---|---|
| 2,459,162 | A | * | 1/1949 | Hayes | 367/104 |
| 3,776,361 | A | * | 12/1973 | Rolle | 367/150 |
| 5,050,128 | A | * | 9/1991 | Saitoh et al. | 367/152 |
| 5,115,414 | A | * | 5/1992 | Atalar et al. | 367/151 |
| 5,577,006 | A | * | 11/1996 | Kuc | 367/104 |
| 2006/0186326 | A1 | | 8/2006 | Ito | |
| 2009/0028002 | A1 | * | 1/2009 | Sugiura et al. | 367/99 |

FOREIGN PATENT DOCUMENTS

| | | |
|---|---|---|
| JP | A-62-010999 | 1/1987 |
| JP | U-62-195783 | 12/1987 |
| JP | A-01-274088 | 11/1989 |
| JP | A-2-196984 | 8/1990 |
| JP | A-05-100011 | 4/1993 |
| JP | A-05-215839 | 8/1993 |
| JP | U-06-10881 | 2/1994 |
| JP | A-06-174829 | 6/1994 |
| JP | 2003-107155 | 4/2003 |
| JP | A-2005-117569 | 4/2005 |
| JP | A-2006-234523 | 9/2006 |
| JP | 2007174323 A * | 7/2007 |

OTHER PUBLICATIONS

Notice of Reasons for Refusal issued from the Japanese Patent Office on Mar. 31, 2009 in the corresponding Japanese patent application No. 2007-193225 (and English translation).

Decision of Refusal issued from the Japanese Patent Office on Jul. 7, 2009 in the corresponding Japanese patent application No. 2007-193225 (with English translation thereof).

* cited by examiner

*Primary Examiner*—Dan Pihulic
(74) *Attorney, Agent, or Firm*—Posz Law Group, PLC

(57) ABSTRACT

An ultrasonic sensor includes a sending device and a receiving device. The sending device has a sending surface for sending an ultrasonic wave into a sending area. The receiving device has a receiving surface for receiving the ultrasonic wave reflected by an external object from a receiving area. The sending area has an overlapping area with the receiving area. The overlapping area is offset to one of the sending area and the receiving area.

2 Claims, 6 Drawing Sheets

US 7,693,007 B2

ULTRASONIC SENSOR WITH SEPARATE SENDING DEVICE AND RECEIVING DEVICE

CROSS REFERENCE TO RELATED APPLICATION

The present application is based on and claims priority to Japanese Patent Application No. 2007-193225 filed on Jul. 25, 2007, the contents of which are incorporated in their entirety herein by reference.

BACKGROUND OF THE INVENTION

1. Field of the Invention

The present invention relates to an ultrasonic sensor that includes a sending device and a receiving device separately.

2. Description of the Related Art

Conventionally, an ultrasonic sensor provided in a vehicle includes a sending device and a receiving device separately. The ultrasonic sensor sends an ultrasonic wave from the sending device, and the ultrasonic wave reflected by an external object is received by the receiving device. Thereby, the ultrasonic sensor detects a direction of the object and a distance to the object. An environment surrounding a vehicle is monitored by using the ultrasonic sensor for enabling a safety drive. For example, the ultrasonic sensor is used for an automatic-parking support system. In the present case, a back sonar including the ultrasonic sensor is disposed at a rear portion of the vehicle. The back sonar detects an ultrasonic wave reflected by people or an obstacle behind the vehicle by using the ultrasonic sensor, and thereby the vehicle can be backed in a parking space without colliding with the people or the obstacle. As an example of the ultrasonic sensor used for a vehicle, JP-2006-234523A discloses an ultrasonic sensor that includes a sending device and a plurality of receiving devices that are arranged to face in the same direction.

The sending device sends the ultrasonic wave into a sending area and the receiving device receives the ultrasonic wave from a receiving area. Thus, in order to detect an obstacle by using the above-described ultrasonic sensor, the obstacle is required to be both in the sending area and the receiving area. That is, the above-described ultrasonic sensor can detect only an obstacle that is located in an overlapping area of the sending area and the receiving area. Thus, when a distance between the ultrasonic sensor and the obstacle is shorter than a distance between the ultrasonic sensor and overlapping area, the ultrasonic sensor cannot detect the obstacle.

SUMMARY OF THE INVENTION

In view of the foregoing problems, it is an object of the present invention to provide an ultrasonic sensor that can detect an obstacle in the vicinity of the ultrasonic sensor.

According to an aspect of the invention, an ultrasonic sensor includes a sending device and a receiving device. The sending device has a sending surface for sending an ultrasonic wave into a sending area. The receiving device has a receiving surface for receiving the ultrasonic wave reflected by an external object from a receiving area. The sending area has an overlapping area with the receiving area. The overlapping area is offset to one of the sending area and the receiving area.

The present ultrasonic sensor can detect an obstacle located in the vicinity of the ultrasonic sensor.

According to another aspect of the invention, an ultrasonic sensor includes a casing having a front side, a sending device located on the front side, and a receiving device located on the front side. The sending device has a sending surface and is configured to send an ultrasonic wave from the sending surface into a sending area. The receiving device has a receiving surface and is configured to receive the ultrasonic wave from a receiving area at the receiving surface, in which the ultrasonic wave is reflected by an object located in an overlapping area defined by an overlap between the sending area and the receiving area. The overlapping area is changed so as to decrease a distance from the front side.

The present ultrasonic sensor can detect an obstacle in the vicinity of the ultrasonic sensor.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1A:
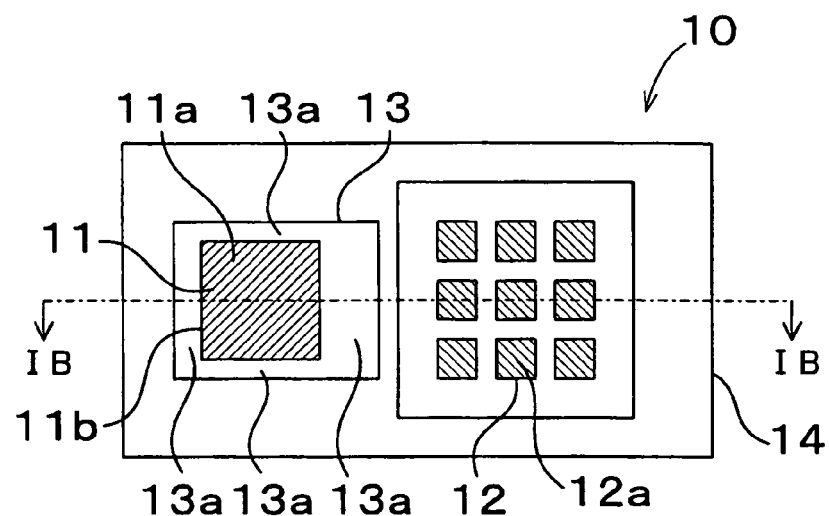
FIG. 1A is a plan view illustrating an ultrasonic sensor according to a first embodiment of the invention.
Figure 1B:
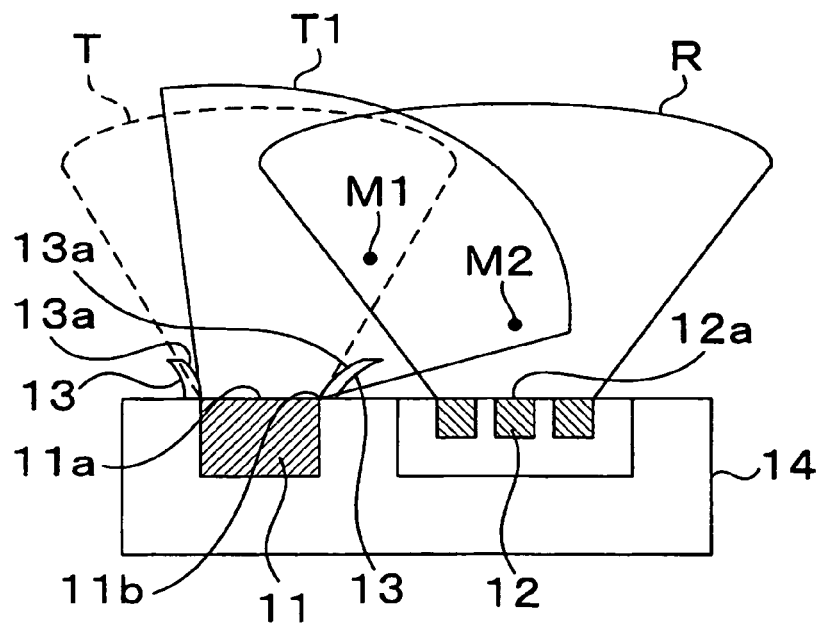
FIG. 1B is a cross-sectional view illustrating the ultrasonic sensor taken along line IB-IB in FIG. 1A.

An ultrasonic sensor 10 according to a first embodiment of the invention will be described with reference to FIGS. 1A and 1B. The ultrasonic sensor 10 can be used for an obstacle sensor provided in a vehicle. In FIG. 1A, a front side shows an outside of the vehicle and a horizontal direction shows a horizontal direction of the vehicle.

The ultrasonic sensor includes a sending device 11, nine receiving devices 12 and a reflecting member 13. The sending device 11 sends an ultrasonic wave toward a front side of the vehicle. The receiving devices 12 detect the ultrasonic wave reflected by an obstacle in front of the vehicle. The reflecting member 13 reflects the ultrasonic wave sent from the sending device 11 for changing a traveling direction of the ultrasonic wave.

The sending device 11 has a sending surface 11a. The sending device 11 is configured to send the ultrasonic wave from the sending surface 11a into a sending area. The sending device 11 is disposed in a casing 14 in such a manner that the sending surface 11a is exposed to an outside of the vehicle. For example, the sending device 11 may be formed by disposing a bulk-shaped piezoelectric member between two electrodes. In the present case, the piezoelectric member is made of lead zirconate titanate (PZT), for example. Alternatively, the sending device 11 may be a thermal excitation type. Alternatively, the sending device 11 may be formed by forming a membrane in a semiconductor substrate using a microelectromechanical system (MEMS) technique.

At an outer peripheral portion 11b of the sending device 11, the reflecting member 13 is disposed. The reflecting member 13 is made of a material that can reflect the ultrasonic wave efficiently. For example, the reflecting member 13 is made of metal or hard resin. The reflecting member 13 has four reflecting surfaces 13a. The reflecting surfaces 13a are configured to reflect the ultrasonic wave sent from the sending surface 11a toward the ultrasonic sensor 10. For example, each of the reflecting surfaces 13a has a curved shape that is convex to the outside of the vehicle. The reflecting surface 13a on the receiving-device side is inclined toward the receiving devices 12 more than the opposite reflecting surface 13a. The reflecting surfaces 13a may be formed as surfaces of a convex polyhedron.

The nine receiving devices 12 are arranged three by three. Each of the receiving devices 12 has a receiving surface 12a and is configured to receive the ultrasonic wave from a receiving area at the receiving surface 12a. Each of the receiving surfaces 12a is exposed to an outside of the vehicle. The sending surface 11a and the receiving surfaces 12a are arranged in parallel. In a manner similar to the sending device 11, the receiving devices 12 may be formed by disposing a bulk-shaped piezoelectric member between electrodes, for example. In the present case, the piezoelectric member may be PZT. Alternatively, the receiving devices 12 may be a thermal excitation type. Alternatively, the receiving devices 12 may be formed by forming a membrane in a semiconductor substrate using a MEMS technique.

A detecting method of the ultrasonic sensor 10 will now be described. The ultrasonic wave sent from the sending surface 11a of the sending device 11 is reflected by an obstacle and is detected by the receiving surfaces 12a of the receiving devices 12 respectively. Then, each of the detected ultrasonic waves is converted into a voltage signal. The voltage signals are transmitted to an electronic control unit (ECU) through a circuit element (not shown). For example, the ECU calculates time differences and phase differences between the sending ultrasonic wave and the detected ultrasonic waves based on the voltage signals from the receiving devices 12, and thereby the ultrasonic sensor 10 detects a distance to the obstacle. In the present case, the receiving devices 12 are arranged in the horizontal direction and the vertical direction. Thus, the ultrasonic sensor 10 can detect a location of the obstacle in addition to the distance to the obstacle by calculating time differences and phase differences among the ultrasonic waves detected by the receiving devices 12.

In order to detect an obstacle by using the ultrasonic sensor 10, the obstacle is required to be located in both the sending area of the sending device 11 and the receiving area of the receiving devices 12. That is, the ultrasonic sensor 10 can detect only the obstacle that is located in an overlapping area of the sending area and the receiving area. By providing the reflecting member 13, the sending area is changed from an area T to an area T1 as illustrated in FIG. 1B. The sending area T1 approaches the receiving devices 12 compared with the sending area T. Thereby, the overlapping area is offset to the receiving area.

Now there are a first obstacle M1 and a second obstacle M2 in front of the ultrasonic sensor 10. The second obstacle M2 is closer to the ultrasonic sensor 10 than the first obstacle M1 is.

When the ultrasonic sensor 10 does not include the reflecting member 13, the sending area of the sending device 11 is the area T, and a detectable area of the ultrasonic sensor 10 is an overlapping area of the sending area T and the receiving area R. Because the first obstacle M1 is located in the overlapping area of the sending area T and the receiving area R, the ultrasonic sensor 10 can detect the first obstacle M1. However, the second obstacle M2 is inside the receiving area R and is outside the sending area T. Thus, the ultrasonic sensor 10 cannot detect the second obstacle M2.

In contrast, when the ultrasonic sensor 10 includes the reflecting member 13, the sending area of sending device 11 is the area T1, and the detectable area of the ultrasonic sensor 10 is an overlapping area of the sending area T1 and the receiving area R. Because both the first obstacle M1 and the second obstacle M2 are located in the overlapping area of the sending area T1 and the receiving area R, the ultrasonic sensor 10 can detect both the first obstacle M1 and the second obstacle M2. That is, when the ultrasonic sensor 10 includes the reflecting member 13, the overlapping area of the sending area T1 and the receiving area R approaches the ultrasonic sensor 10. Thus, the ultrasonic sensor 10 can detect the second obstacle M2, which is at a short distance from the ultrasonic sensor 10 compared with the detectable area in a case where the ultrasonic sensor 10 does not include the reflecting member 13.

In the above-described embodiment, the reflecting member 13 has the four reflecting surfaces 13a at the outer peripheral portion 11b of the sending device 11, as an example. Alternatively, the reflecting member 13 may have at least two reflecting surfaces 13a including the reflecting surface 13a on the side of the receiving devices 12 and the opposite reflecting surface 13a.

Alternatively, the reflecting member 13 may have a horn shape that defines a passage in which the ultrasonic wave resonates. In the present case, because the ultrasonic wave resonates in the reflecting member 13, a sound pressure of the ultrasonic wave increases.

The number of the receiving device 12 may be changed depending on the intended usage. For example, when the ultrasonic sensor 10 is used for a two-dimensional detection, the number of the receiving device 12 may be two. Alternatively, the number of the receiving device 12 arranged in one direction may be larger than the other direction. For example, twelve receiving devices 12 may be arranged three by four.

In the ultrasonic sensor 10 illustrated in FIG. 1, the sending device 11 and the receiving devices 12 are arranged in the horizontal direction, as an example. Alternatively, the sending device 11 and the receiving devices 12 may be arranged in the vertical direction.

As described above, the ultrasonic sensor 10 has the reflecting member 13 adjacent to the outer peripheral portion 11b of the sending surface 11a. The reflecting member 13 reflects the ultrasonic wave for changing the traveling direction of the ultrasonic wave. Thereby, the overlapping area is offset to the receiving area R and the distance between the overlapping area and the ultrasonic sensor 10 decreases. Thereby, the ultrasonic sensor 10 can detect an obstacle (e.g., the second obstacle M2) that is at a short distance from the ultrasonic sensor 10 compared with the detectable area in the case where the ultrasonic sensor 10 does not include the reflecting member 13. In addition, the ultrasonic wave whose traveling direction is changed by the reflecting member 13 transmits in air. Thus, an attenuation of the ultrasonic wave can be reduced.

Second Embodiment

Figure 2:
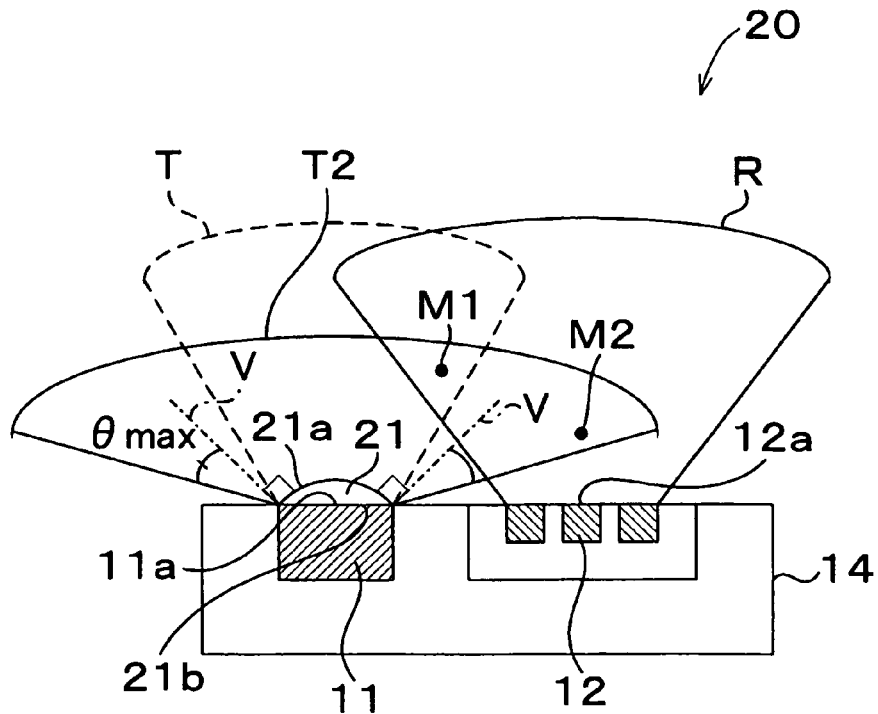
FIG. 2 is a cross-sectional view illustrating an ultrasonic sensor according to a second embodiment of the invention.

An ultrasonic sensor 20 according to a second embodiment of the invention will be described with reference to FIG. 2. The ultrasonic sensor 20 includes a refracting member 21 instead of the reflecting member 13 provided in the ultrasonic sensor 10. The refracting member 21 refracts the ultrasonic wave for changing the traveling direction of the ultrasonic wave.

The refracting member 21 is made of a material that has a small acoustic impedance compared with the sending device 11. For example, the refracting member 21 is made of resin material including polycarbonate. The refracting member 21 has a sending surface 21a and an attaching surface 21b. The sending surface 21a is formed to have a part of spherical surface. The attaching surface 21b has a flat shape and is attached to the sending surface 11a of the sending device 11.

The ultrasonic wave sent from the sending device 11 transmits to the refracting member 21 through the sending surface 11a and the attaching surface 21b. The ultrasonic wave transmitted from the attaching surface 21b travels an inside of the refracting member 21 and is refracted at the sending surface 21a. A sending area T2 of the refracted ultrasonic wave depends on the refractive index of the refracting member 21. The sending area T2 expands from the normal direction V at end portions of the refracting member 21 by the maximum irradiating angle θmax. Now, in a case where the ultrasonic wave is transmitted from the sending device 11 to a medium and the ultrasonic wave is irradiated from a surface of the medium, an angle between an irradiatable direction and the normal direction of the surface is defined as the maximum irradiating angle θmax. The maximum irradiating angle θmax depends on the refractive index of the refracting member 21. When the refracting member 21 is made of polycarbonate, the maximum irradiating angle θmax is about 7 degrees.

By providing the refracting member 21, the sending area expands from the area T to the area T2. Thereby, the overlapping area of the sending area T2 and the receiving area R2 is offset to the receiving area R, and the overlapping area approaches the ultrasonic sensor 20. Thus, the ultrasonic sensor 20 can detect the second obstacle M2 that is at a short distance from the ultrasonic sensor 20 compared with the detectable area in a case where the ultrasonic sensor 20 does not include the refracting member 21. In addition, the traveling direction of the ultrasonic wave can be changed with a shape of the sending surface 21a of the refracting member 21. Thus, the degree of freedom of changing the sending area increases.

Figure 3A:
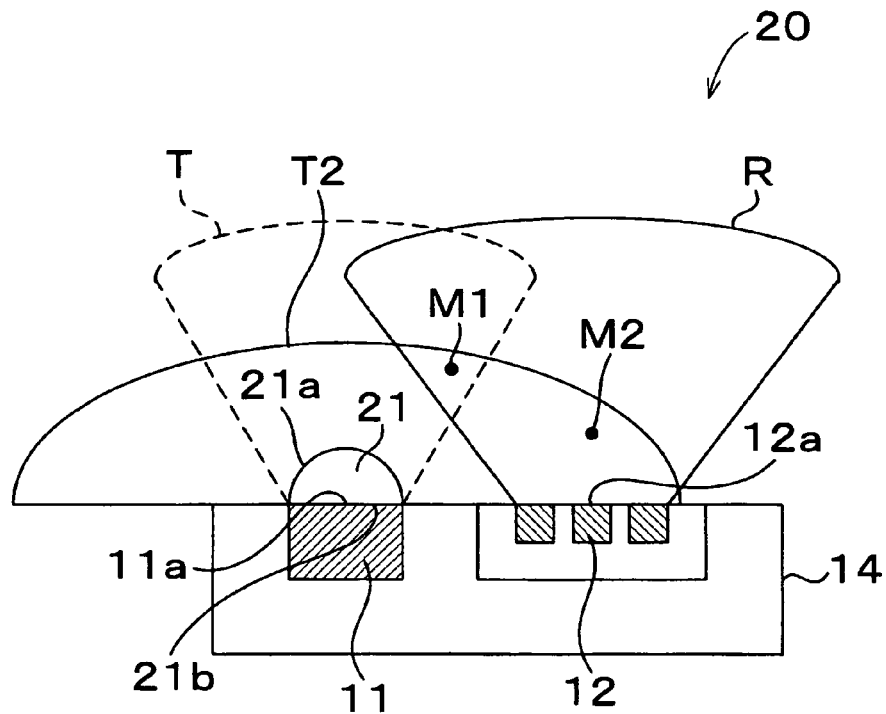
FIG. 3A is a cross-sectional view illustrating an ultrasonic sensor according to a first modification of the second embodiment.

The refracting member 21 may have other shape as long as the overlapping area can approach the sending device 11 and the receiving devices 12. For example, as illustrated in FIG. 3A, the sending surface 21a may be a hemisphere surface. In the present case, the sending surface 21a has the normal in the whole direction on a front side of the vehicle. Thus, sending area T2 has a directivity of 180 degrees. As a result, the sending area T2 and the receiving area R can overlap at an area adjacent to the ultrasonic sensor 20, and thereby the ultrasonic sensor 20 can detect an obstacle adjacent to the ultrasonic sensor 20.

Figure 3B:
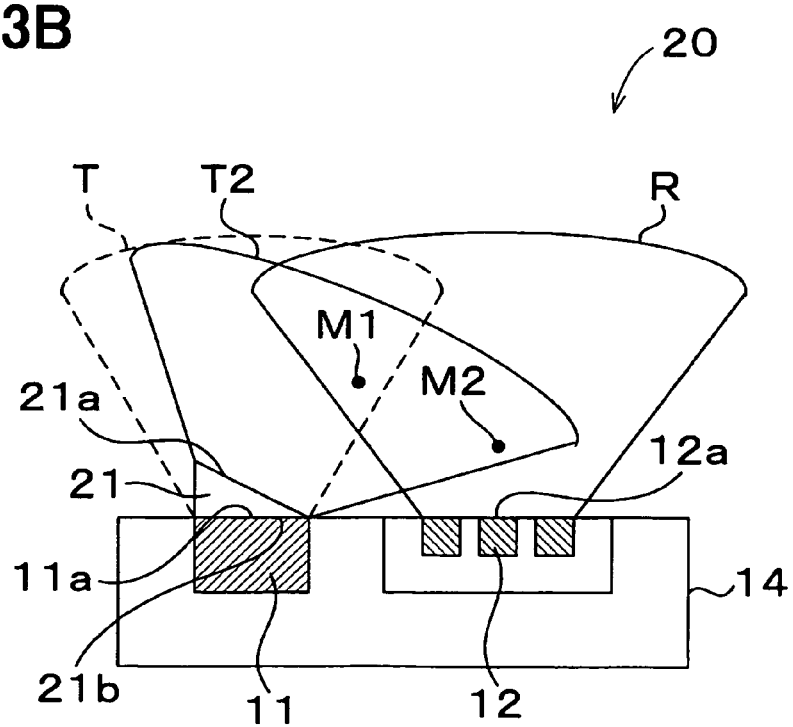
FIG. 3B is a cross-sectional view illustrating an ultrasonic sensor according to a second modification of the second embodiment.

Alternatively, as illustrated in FIG. 3B, the sending surface 21a may be a plane that is inclined toward the receiving devices 12. In the present case, the sending area T2 is inclined toward the receiving devices 12. Thereby, the overlapping area of the sending area T2 and the receiving area R is offset to the receiving area R, and the overlapping area approaches the sending device 11 and the receiving devices 12. In addition, the sending area T2 is narrow compared with a case where the sending surface 21a is curved. Thus, the acoustic voltage of the ultrasonic wave increases and a detection sensitivity of the ultrasonic sensor 20 is improved.

Alternatively, the sending surface 21a may be a surface of a convex polyhedron, a surface of a column, or a curved surface that is asymmetric in the horizontal direction, for example.

The refracting member 21 is made of other material as long as the refractive index is small and the material is robust. For example, the refracting member 21 may be made of metal, glass, ceramics, or rubber. When a material and a paint are selected in such a manner that a color tone of the refracting member 21 is similar to a color tone of a surrounding member, the ultrasonic sensor 20 can be unnoticeable. Thereby, the design of the ultrasonic sensor 20 can be improved.

As described above, the ultrasonic sensor 20 includes the refracting member 21. The refracting member 21 is attached to the sending surface 11a of the sending device 11 and refracts the ultrasonic wave transmitted from the sending device 11 for changing the traveling direction of the ultrasonic wave. Thus, the overlapping area of the sending area T2 and the receiving area R is offset to the receiving area R, and the distance between the overlapping area and the ultrasonic sensor 20 decreases. Thereby, the ultrasonic sensor 20 can detect an obstacle (e.g., the second obstacle M2) that is at a short distance from the ultrasonic sensor 20 compared with the detectable area in a case where the ultrasonic sensor 20 does not include the refracting member 21. In addition, the traveling direction of the ultrasonic wave can be changed with the shape of the sending surface 21a of the refracting member 21. Thus, the degree of freedom of changing the sending area increases. When the refracting member 21 is convex to the outside of the vehicle, the sending area T2 expands and the detectable area expands.

Third Embodiment

Figure 4:
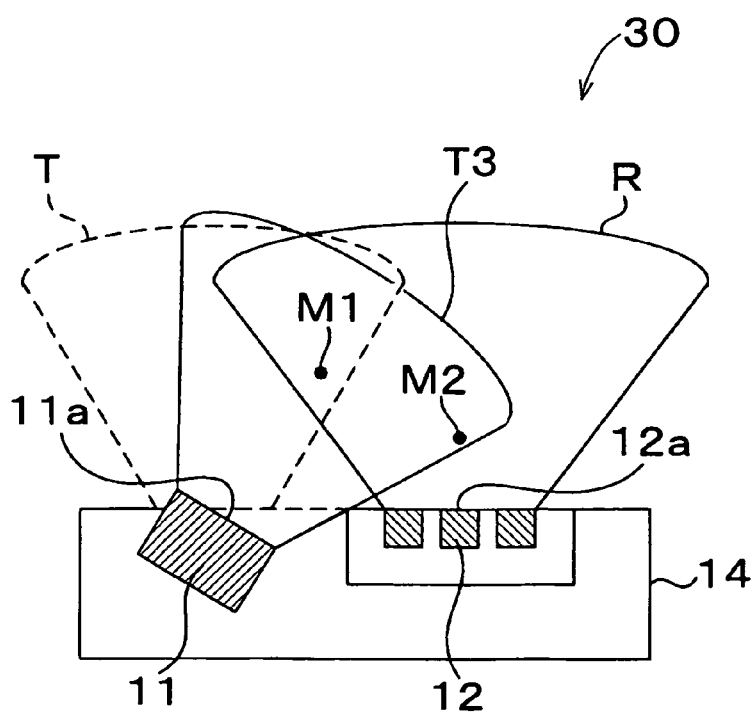
FIG. 4 is a cross-sectional view illustrating an ultrasonic sensor according to a third embodiment of the invention.

An ultrasonic sensor 30 according to a third embodiment of the invention will be described with reference to FIG. 4. In an ultrasonic sensor 30, the sending device 11 is disposed in such a manner that the sending surface 11a is inclined toward the receiving devices 12 and an angle between the sending surface 11a and the receiving surfaces 12a is less than 180 degrees. For example, the sending surface 11a is inclined at an angle of 10 degrees with respect to the receiving surfaces 12a. Thereby, an overlapping area of a sending area T3 and the receiving area R is offset to the receiving area R, and the overlapping area can approach the ultrasonic sensor 30. Thus, the ultrasonic sensor 30 can detect an obstacle (e.g., the second obstacle M2) that is at a short distance from the ultrasonic sensor 30 compared with the detectable area in a case where the sending surface 11a is not inclined.

Figure 5:
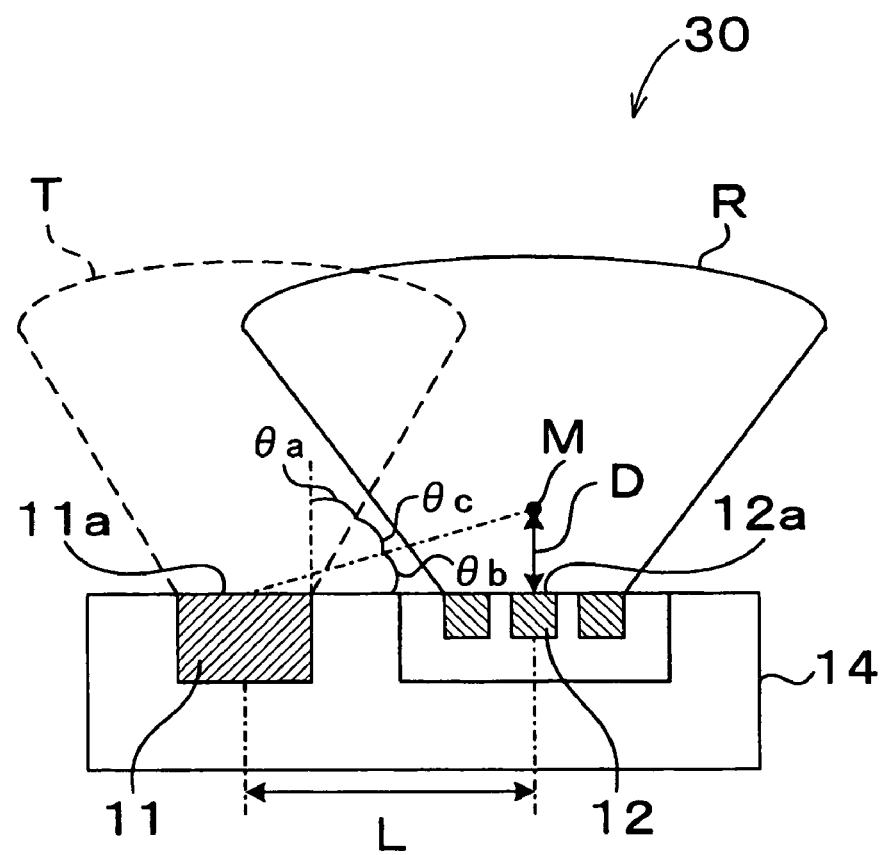
FIG. 5 is a schematic diagram illustrating a relationship between an inclination angle θc and a detectable area.

A relationship between an inclination angle θc of the sending surface 11a and a detectable distance to an obstacle will now be described with reference to FIG. 5. The sending area T and the receiving area R can be represented by directivity. The directivity means a range in which the acoustic voltage becomes about a half (e.g., −3 dB) of a center acoustic voltage. An expanse of the range can be represented by a directional angle that is an angle from the normal direction of the sending surface 11a or the receiving surfaces 12a. For example, a distance between a center portion of the sending surface 11a and a center portion of the receiving surfaces 12a is expressed by a distance L (mm), a distance between the receiving surfaces 12a and an obstacle M in front of the receiving surfaces 12a is expressed by a distance D (mm), the directional angle of the sending device 11 is expressed by an angle θa (degree), and an angle between the sending surface 11a and a line that connects the center portion of the sending surface 11a and the obstacle M is expressed by an angle θb (degree).

The obstacle M is inside of the receiving area R and is outside of the sending area T. Thus, in order to detect the obstacle M by using the ultrasonic sensor 30, the sending area T is required to be inclined toward the receiving devices 12 at an angle larger than a case where the obstacle M is located on a boundary of the sending area T.

The inclination angle θc (degree) that enables the ultrasonic sensor 30 to detect the obstacle M can be indicated by following expression (1).

$$\theta c = 90 - \theta a - \theta b \qquad (1)$$

In addition, the angle θb can be indicated by following expression (2).

$$\theta b = \tan^{-1}(D/L). \qquad (2)$$

According to expression (1) and expression (2), when the directional angle θa is 35 degrees, the distance L between the center portion of the sending device 11 and the center portion of the receiving devices 12 is 50 mm, and the distance D between the obstacle M and the receiving surfaces 12a is 50 mm, the inclination angle θc becomes about 10 degrees. Thus, when the sending device 11 is inclined toward the receiving devices 12 at an angle of 10 degrees, the ultrasonic sensor 30 can detect the obstacle M at a distance 50 mm from the receiving surfaces 12a.

Figure 6A:
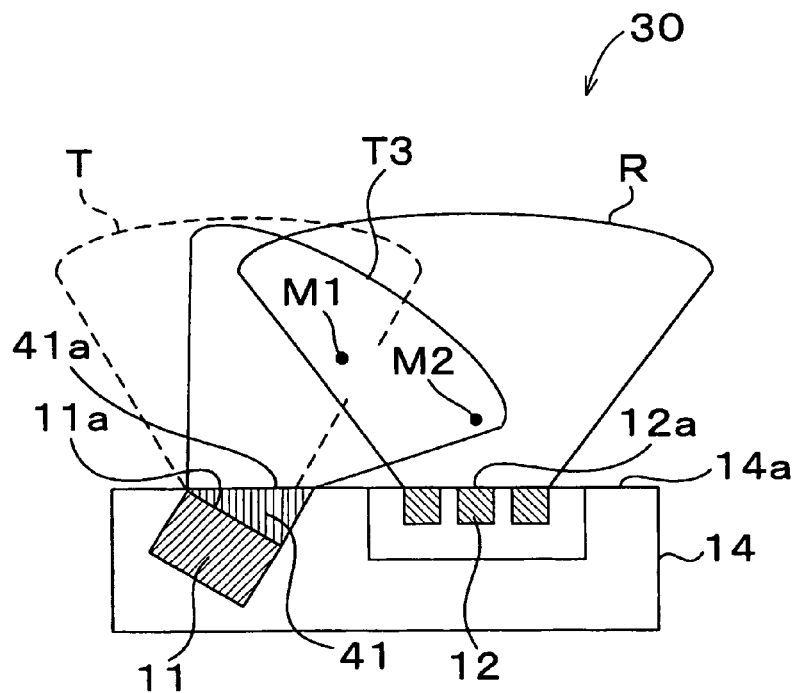
FIG. 6A is a cross-sectional view illustrating an ultrasonic sensor according to a first modification of the third embodiment.

As illustrated in FIG. 6A, the inclined sending device 11 may be disposed in the casing 14 in such a manner that the sending device 11 does not protrude from a surface 14a of the casing 14 and an acoustic matching layer 41 may be disposed between the surface 14a and the sending surface 11a. In the present case, a surface 41a of the acoustic matching layer 41 is arranged in parallel to the receiving surfaces 12a. The acoustic matching layer 41 is made of a material that has a small acoustic impedance compared with the sending device 11. For example, the acoustic matching layer 41 may be made of resin including polycarbonate. By providing the acoustic matching layer 41, the ultrasonic wave is treated with acoustic matching at the sending surface 11a and the sound pressure of the ultrasonic wave increases.

Figure 6B:
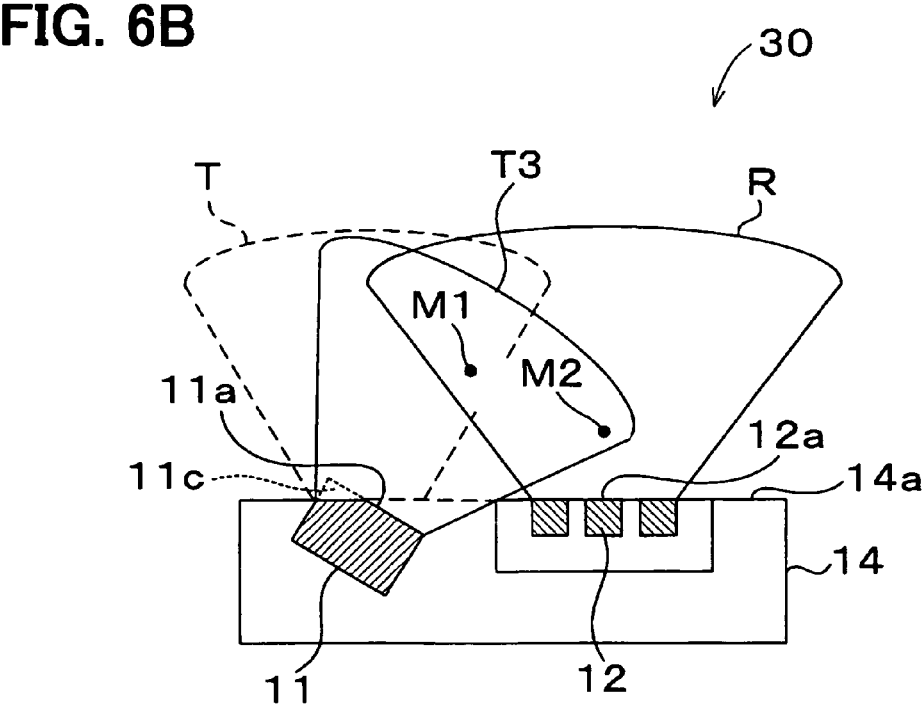
FIG. 6B is a cross-sectional view illustrating an ultrasonic sensor according to a second modification of the third embodiment.

In a case where the sending device 11 has an acoustic matching layer, as illustrated in FIG. 6B, an acoustic matching layer 11c protruding from the surface 14a of the casing 14 may be removed. In the present case, no portion protrudes from the surface 14a of the casing 14. Thus, the design of the ultrasonic sensor 30 can be improved. In addition, a thickness of the acoustic matching layer varies with place by removing the acoustic matching layer 11c. Thus, a band of resonant frequency becomes wide.

Figure 7:
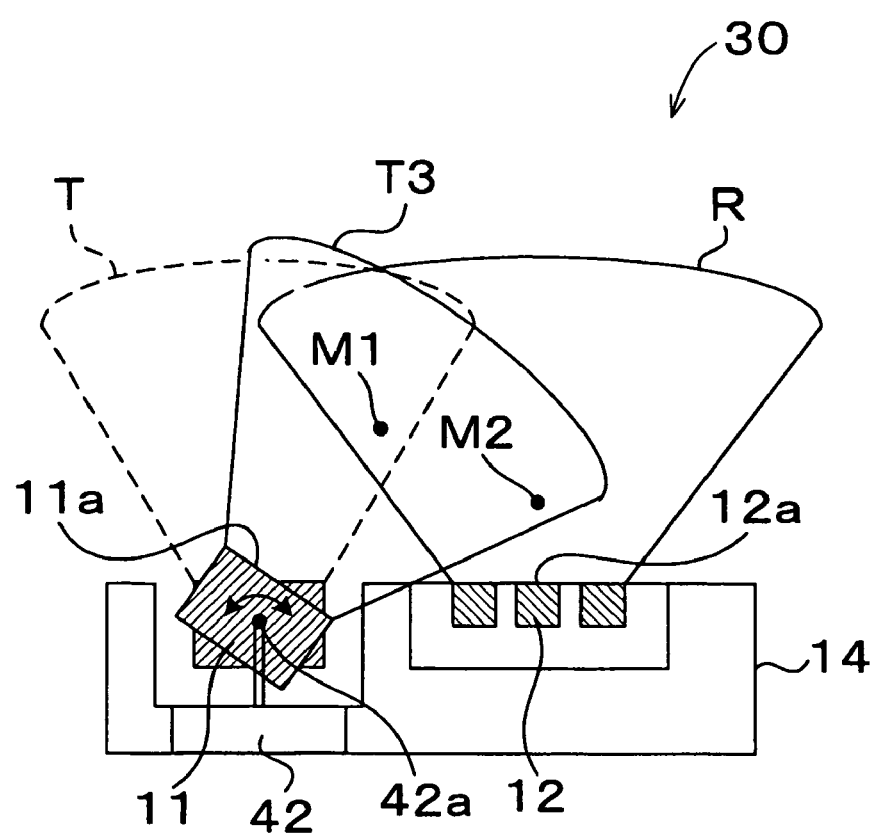
FIG. 7 is a cross-sectional view illustrating an ultrasonic sensor according to a third modification of the third embodiment.

Alternatively, as illustrated in FIG. 7, the ultrasonic sensor 30 may include an inclining unit 42 for changing the inclination angle of the sending surface 11a with respect to the receiving surfaces 12a. For example, the sending device 11 may be held by a rotation shaft 42a of the inclining unit 42 to be rotatable. The inclining unit 42 rotates the sending device 11 so that the sending device 11 is inclined toward the receiving devices 12. In the present case, the overlapping area of the sending area T3 and the receiving area R can be changed in accordance with a position of an obstacle. Thus, the detection accuracy of the ultrasonic sensor 30 can be improved.

The ultrasonic sensor 30 may include one of the reflecting member 13 and the refracting member 21.

In the ultrasonic sensor 30, the sending surface 11a is inclined with respect to the receiving surfaces 12a. Thus, the overlapping area is offset to the receiving area R, and the distance between the overlapping area and the ultrasonic sensor 30 decreases. Thus, the ultrasonic sensor 30 can detect an obstacle (e.g., the second obstacle M2) that is at a short distance from the ultrasonic sensor 30 compared with a detectable area in a case where the sending surface 11a and the receiving surfaces 12a are arranged in parallel.

When the ultrasonic sensor 30 includes the inclining unit 42 for changing the inclination angle between the sending surface 11a and the receiving surface 12a, the overlapping area of the sending area T3 and the receiving area R can be changed in accordance with a position of an obstacle. Thus, the detection accuracy of the ultrasonic sensor 30 can be improved.

Other Embodiments

Although the present invention has been fully described in connection with the preferred embodiments thereof with reference to the accompanying drawings, it is to be noted that various changes and modifications will become apparent to those skilled in the art.

In the above-described first to third embodiments, the ultrasonic sensor includes one sending device 11, as an example. Alternatively, a plurality of sending devices 11 may be arranged in a manner similar to the receiving devices 12. In the present case, a direction of a area having a high central sound pressure can be changed in such a manner the sending area approaches the ultrasonic sensor.

In the above-described first to third embodiments, the sending area is approached to the ultrasonic sensor for approaching the overlapping area of the sending area and the receiving area to the ultrasonic sensor. Alternatively, the reflecting member 13, the refracting member 21, and the inclining unit 42 may be provided to the receiving devices 12 so that the receiving area approaches the ultrasonic sensor. Alternatively, the receiving devices 12 may be inclined toward the sending device 11. Alternatively, both of the sending area and the receiving area may be approached to the ultrasonic sensor.

Such changes and modifications are to be understood as being within the scope of the present invention as defined by the appended claims.

What is claimed is:

1. An ultrasonic sensor comprising:
a casing;
a sending device disposed in the casing and having a sending surface for sending an ultrasonic wave;
a receiving device disposed in the casing and having a receiving surface configured to receive the ultrasonic wave reflected by an external object; and
an acoustic matching layer; wherein:
the sending device is arranged in such a manner that the sending surface is inclined toward the receiving surface and the sending device does not protrude from a surface of the casing;
the acoustic matching layer is disposed between the surface of the casing and the sending surface;
the acoustic matching layer is made of a material having a small acoustic impedance compared with the sending device, a planar surface of the acoustic matching layer being disposed in the plane of the surface of the casing and being arranged in parallel to the plane of the receiving surface.

2. An ultrasonic sensor comprising:

a casing;

a sending device disposed in the casing and having a sending surface for sending an ultrasonic wave;

a receiving device disposed in the casing and having a receiving surface configured to receive the ultrasonic wave reflected by an external object; and an acoustic matching layer; wherein:

the sending device is arranged in such a manner that the sending surface is inclined toward the receiving surface and the sending device does not protrude from a surface of the casing;

the acoustic matching layer is disposed between the surface of the casing and the sending surface;

the acoustic matching layer is made of a material having a small acoustic impedance compared with the sending device;

a reflecting member coupled to at least one of the sending surface and the receiving surface, the reflecting member being disposed adjacent to an outer peripheral portion of the one of the sending surface and the receiving surface; and the reflecting member being configured to reflect the ultrasonic wave for changing a traveling direction of the ultrasonic wave.

* * * * *